United States Patent [19]

Lewis et al.

[11] 4,069,239
[45] Jan. 17, 1978

[54] THERMALLY STABLE HIGH MOLECULAR WEIGHT ACYL PEROXYCARBONIC ESTERS

[75] Inventors: Roger N. Lewis, Martinez; Ronald L. Pastorino, Larkspur; James F. Wilts, Richmond, all of Calif.

[73] Assignee: Argus Chemical Corporation, Brooklyn, N.Y.

[21] Appl. No.: 774,833

[22] Filed: Mar. 7, 1977

Related U.S. Application Data

[62] Division of Ser. No. 696,463, June 16, 1976, Pat. No. 4,051,310.

[51] Int. Cl.² .................. C07C 69/96; C07C 71/00
[52] U.S. Cl. .......................... 260/463; 260/453 RZ
[58] Field of Search ................... 260/463, 453 RZ

[56] References Cited

U.S. PATENT DOCUMENTS

| 3,108,093 | 10/1963 | Pajaczkowski et al. | 260/463 |
| 3,585,232 | 6/1971 | Lewis et al. | 260/463 |
| 3,637,633 | 1/1972 | Dixon et al. | 260/463 |
| 3,652,524 | 3/1972 | Lewis et al. | 260/92.8 W |

Primary Examiner—Joseph Paul Brust
Assistant Examiner—Molly C. Eakin
Attorney, Agent, or Firm—Townsend and Townsend

[57] ABSTRACT

Acyl peroxycarbonic esters of the formula

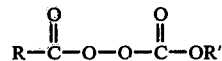

in which R is methyl or ethyl, R' is alkyl, and R and R' together have 17 or more carbon atoms. The compounds have unusual thermal stability, together with improved polymerization initiating efficiency. Particularly outstanding efficiency is found in connection with the polymerization of methyl methacrylate.

8 Claims, No Drawings

THERMALLY STABLE HIGH MOLECULAR WEIGHT ACYL PEROXYCARBONIC ESTERS

This is a division of application Ser. No. 696,463, filed June 16, 1976 now U.S. Pat. No. 4,051,310.

This invention relates to organic peroxide compositions and their use as polymerization initiators. More particularly, the invention relates to certain higher molecular weight acyl peroxycarbonic esters that exhibit improved thermal stability, together with increased polymerization initiation efficiencies and other improved properties.

U.S. Pat. No. 3,108,093 describes a number of peroxycarbonic esters including a group of acyl peroxycarbonic esters. The molecules disclosed therein are stated to have thermal stabilities which do not "complicate the polymerization process they catalyze." The patentees, thus, recognize the potential problem of thermal stability in molecules of this type.

U.S. Pat. Nos. 3,585,232, 3,652,524 and 3,736,344 describe a group of acyl peroxycarbonic esters having lower molecular weights than described in said U.S. Pat. No. 3,108,093 and which have improved efficiencies in the polymerization of monomers.

The present invention provides a group of related acyl peroxycarbonic esters which demonstrate dramatically improved thermal stabilities as compared with analogous molecules described in U.S. Pat. No. 3,108,093. Further, in addition to being more thermally stable, they exhibit improvements in the polymerization of certain compounds, including ethylene, styrene, vinyl chloride, vinyl chloride and vinyl acetate comonomers, methyl methacrylate, ethylenically unsaturated polyester, and in the vulcanization of general purpose silicone rubber (silicone rubber that is cross-linkable through ethylenically unsaturated sites). Particularly outstanding improvements have been found in the polymerization of methyl methacrylate. Also, in the polymerization of ethylenically unsaturated polyester in the presence of tertiary amine promoters it has been found that the present initiators produce less yellowing in the polymeric end product.

These improvements are obtained in the present invention through the use of acyl peroxycarbonic esters of the formula:

$$R-\overset{O}{\underset{\|}{C}}-O-O-\overset{O}{\underset{\|}{C}}-OR'$$

where R is selected from methyl and ethyl; and R' is an alkyl group which together with R contains a total of 17 to about 25 carbon atoms. Preferably, R and R' have a total of 17 to about 20 carbon atoms.

Apart from the employment of the novel compounds of this invention, the polymerization and vulcanization processes in which they are used is consistent with the teachings of the prior art, including quantities of reactants, temperatures, solvents, optional additives and the like.

The following example which is for the preparation of acetyl peroxystearyl carbonate illustrates the procedure utilized to prepare the various acyl peroxycarbonic esters listed in Table I. The other novel compounds of this invention were prepared by substitution of the appropriate chloroformate and peracid in the following example.

To 9.34 g. (0.0295 mole) of 24% peracetic acid in ethyl acetate and 25 ml acetone containing 1 drop of Triton X-100 surfactant is added simultaneously 8.94 g. (0.0268 mole) of stearyl chloroformate and 2.76 g. (0.0349 mole) of pyridine over a 17-minute period at $-3°$ to $-5°$ C. The addition funnel was rinsed with 7–8 ml of hexane. The reaction mixture is well stirred during these additions. After the reaction mixture is stirred an additional 2 hours at $-5°$ C., the reaction mixture is filtered to remove the pyridinium hydrochloride. The filter cake and reactor were rinsed with ether. The cake was transferred to a separatory funnel and extracted with 50 ml $CHCl_3$ and then with 50 ml ether. These two extractions were combined with the initial filtrate in another separatory funnel. The organic layer was washed as follows: once with 100 ml saturated NaCl solution, pH 6–7; once with 100 ml cold 1% $H_2SO_4$ solution, pH 2; once with 100 ml saturated NaCl solution, pH 2; once with 100 ml saturated $NaHCO_3$ solution, pH 8; once with 100 ml ice water, pH 8; and finally twice with 100 ml saturated NaCl solution, both pH's 7. The organic layer was filtered through a cake of anhydrous $MgSO_4$ and concentrated under vacuum on a 10° C. $H_2O$ bath. Product A.O. (active oxygen) analysis: Theory, 4.29; found 3.79, 88.45% pure; 81.1% yield.

TABLE I

Data on Various Acyl Peroxycarbonic Esters: $R-\overset{O}{\underset{\|}{C}}-OO-\overset{O}{\underset{\|}{C}}-OR'$

| Peroxide | R + R' (No. of C Atoms) | % Purity | m.p. ° C | Ten Hour, Half-Life[1] Temp, ° C | Synthesis Results % Purity | Yield |
|---|---|---|---|---|---|---|
| 1. Acetyl peroxycetyl carbonate (APCC) | 17 | 96.3 | 44–45 | 55.1 | 94.12 | 87.7 |
| 2. Acetyl peroxystearyl carbonate (APSC) | 19 | 97.7 | 54–55 | 54.9 | 88.45 | 81.1 |
| 3. Propionyl peroxycetyl carbonate (PPCC) | 18 | 96.0 | 30–31 | 51.5 | 88.72 | 85.0 |
| 4. Propionyl peroxystearyl carbonate (PPSC) | 20 | 96.0 | 39–40 | 52.3 | 87.87 | 84.4 |
| 5. Lauroyl peroxyoctyl carbonate (LPOC) | 19 | 98.7 | 4–6 | 51.4 | 87.58 | 88.7 |

[1] 0.2 M peroxide in benzene

The storage stability of the new molecules of this invention, including the improved thermal stability at 30° C is shown in the following Table II. The abbreviations of the molecule names are the same throughout and are defined in Table I. LPOC is included as typical of the prior art as disclosed in U.S. Pat. No. 3,108,093.

TABLE II

Storage Stability of Various Acyl Peroxycarbonic Esters at 30° C

| Peroxide TAO[1] | APSC 4.29 | | APCC 4.64 | | PPSC 4.14 | | PPCC 4.46 | | LPOC 4.29 | |
|---|---|---|---|---|---|---|---|---|---|---|
| Days Elapsed | A.O.[2] | % Purity | A.O. | % Purity | A.O. | % Purity | A.O. | % Purity | A.O. | % Purity |
| 0 | 4.19 | 97.67 | 4.55 | 98.06 | 3.90 | 94.20 | 4.36 | 97.76 | 4.22 | 98.37 |
| 1 | — | — | — | — | — | — | — | — | 3.57 | 83.22 |
| 4 | — | — | — | — | — | — | — | — | 2.04 | 47.55 |
| 6 | — | — | — | — | — | — | — | — | 1.52 | 35.43 |
| 7 | — | — | — | — | — | — | 1.95 | 43.74 | — | — |
| 8 | — | — | — | — | — | — | — | — | 1.19 | 27.74 |
| 11 | — | — | — | — | — | — | 1.27 | 28.48 | | |
| 13 | — | — | — | — | 3.84 | 92.75 | | | | |
| 25 | 4.16 | 96.97 | 4.55 | 98.06 | — | — | | | | |
| 28 | — | — | — | — | 3.58 | 86.47 | | | | |
| 32 | — | — | — | — | 3.17 | 76.57 | | | | |
| 39 | 4.14 | 96.50 | 4.57 | 98.49 | — | — | | | | |
| 46 | — | — | — | — | 1.07 | 25.85 | | | | |
| 52 | 4.12 | 96.00 | — | — | | | | | | |
| 53 | — | — | 4.57 | 98.49 | | | | | | |
| 80 | 4.07 | 94.86 | — | — | | | | | | |
| 81 | — | — | 4.52 | 97.41 | | | | | | |
| 95 | — | — | 4.51 | 97.20 | | | | | | |
| 97 | 4.10 | 95.57 | — | — | | | | | | |

[1]Theoretical Active Oxygen
[2]Active Oxygen

In view of the extraordinary stability of APSC and APCC, these two molecules were further tested at an even higher temperature of 41°–42° C. for a period of time. The results of this additional test are shown in Table II-A below.

TABLE II-A

Storage Stability of Two Acyl Peroxycarbonic Esters at 41–42° C.

| Peroxide TAO | APSC 4.29 | | APCC 4.64 | |
|---|---|---|---|---|
| Days Elapsed | A.O. | % Purity | A.O. | % Purity |
| 0 | 4.22 | 98.37 | 4.60 | 99.14 |
| 3 | 4.22 | 98.37 | 4.59 | 98.92 |
| 9 | 4.22 | 98.37 | 4.47 | 96.34 |
| 15 | 4.20 | 97.90 | 2.57 | 55.39 |
| 17 | — | — | 1.03 | 22.20 |
| 20 | 4.25 | 99.07 | | |
| 28 | 4.22 | 98.37 | | |
| 35 | 4.15 | 96.74 | | |
| 42 | 4.16 | 96.97 | | |

The compounds of this invention are relatively safely handled peroxides as shown by CPPSD tests (standard safety tests of Society Of The Plastics Industry, Inc., Organic Peroxide Producers Safety Division) as set forth in Table III below.

TABLE III

OPPSD Tests Made on Various Acyl Peroxycarbonic Esters (99% Purity)

| | Peroxide | APSC | APCC | PPSC |
|---|---|---|---|---|
| 1. Rapid Heat | Decomp. Temp, ° C | 82 | 77 | 85 |
| | Force | Inter[1] | Inter | Inter |
| 2. PVT | Vent Diameter, mm | <1½ | 2 | <1 |
| | Hazard | Low-Inter | Inter | Low |
| 3. Burning | Flame Height, cm | 46 | 122 | 137 |
| | Hazard | Low | Inter-Max | Inter-Max |
| 4. Autoignition at 330–340° C | | None | None | None |
| 5. SADT (Estimated) for 7# in 4 gal Fiberpak | | 55° C | 46° C | 43° C |

[1]Intermediate

The utility and improved efficiencies of the present molecules in polymerization reactions is demonstrated by the following examples in connection with a series of different polymerizable and vulcanizable materials.

Polyester Resins

Data on the testing of these new acyl peroxycarbonic esters as initiators of ethylenically unsaturated polyester resins are found in Tables IV–VI.

In Table IV, results of testing a series of peroxides at equivalent A.O. in a Hot Block Gel Tester at 180° F. are shown. Four commercial peroxides are included for comparison purposes. Of the acyl peroxycarbonic esters tested, the acetyl derivatives gave higher peak temperatures than the other three, indicating a somewhat higher degree of cure.

The data in Tables V and VI demonstrate the improved utility of APSC over two commercial peroxides presently used because of their fire resistant properties. In Table V, Hot Block gel tests were done at 140°–200° F. using three peroxides. Results indicate that APSC "kicks-off" at a lower temperature than either 2,5-dimethyl-2,5-di(2-ethyl hexanoyl peroxy) hexane or benzoyl peroxide. In addition, lower concentrations of APSC can be used to achieve similar or superior results over the entire temperature range.

Table VI shows that APSC can also be used in room temperature curing of unsaturated polyesters using the same promoter systems as used with benzoyl peroxide (BPO). Several tertiary amines commonly used in the industry were screened. Results indicate that faster cure cycles are obtained with the APSC systems as compared to the BPO systems. In addition, smaller amounts of promoter can be used with APSC to match the performance of the equivalent BPO system. Tertiary amines are known to be poor promoters for outdoor applications with BPO because of the yellowing problem. However, with APSC, the color is much lighter even at equivalent amounts of any of these amines.

TABLE IV

Hot Block Gel Tests With Polyester Resin Using Various Peroxides[1]
Resin: Hatco GR941 (Isophthalic)
Block Temp: 180° F. (82° C.)
Concentration of each peroxide equal to AO equivalent of 3.50%

| Peroxide | Ten-Hour Half-Life[2] Temp, ° C | % Wt Used | Gel Time, Min. | Exotherm Time, Min. | Peak ° F | Temp, (° C) |
|---|---|---|---|---|---|---|
| 1. LPOC | 51.4 | 0.82 | 2.87 | 3.97 | 260 | (127) |
| 2. PPCC | 51.5 | 0.78 | 2.65 | 3.67 | 272 | (133) |
| 3. PPSC | 52.3 | 0.85 | 2.72 | 3.79 | 272 | (133) |
| 4. APSC | 54.9 | 0.82 | 3.35 | 4.60 | 293 | (145) |
| 5. APCC | 55.1 | 0.75 | 3.36 | 4.58 | 289 | (143) |
| 6. t-Butyl peroxy pivalate | 55 | 0.38 | 3.05 | 4.00 | 298 | (148) |
| 7. Decanoyl Peroxide | 62 | 0.75 | 3.87 | 4.99 | 293 | (145) |
| 8. 2,5-Dimethyl-2,5-di-(2-ethyl hexanoyl peroxy) hexane | 68 | 0.47 | 6.3 | 7.63 | 303 | (151) |
| 9. Benzoyl peroxide | 72 | 0.53 | 8.35 | 10.76 | 264 | (129) |

[1] 5 cc of a 50 g mixture charged to Hot Block
[2] 0.2 M. peroxide in benzene

TABLE V

Hot Block Gel Tests at 140–200° F Using Three Peroxides[1]
Resin: Hatco GR14017 (Isophthalic)

| Block Temp., ° F | Peroxide Conc, % wt | APSC | | | 2,5-Dimethyl-2,5-di(2-ethyl hexanoyl Peroxy) hexanoyl | | Benzoyl Peroxide |
|---|---|---|---|---|---|---|---|
| | | 0.5 | 0.75 | 1 | 0.5 | 1 | 1 |
| 140 | Gel Time, Min. | — | — | 20.56 | — | — | — |
| | Exotherm Time, Min | — | — | 22.43 | — | — | — |
| | Peak Temp, ° F | — | — | 262.5 | — | — | — |
| 150 | | — | 12.91 | 8.94 | — | 19.91 | — |
| | | — | 14.10 | 10.33 | — | 21.35 | — |
| | | — | 276 | 287.5 | — | 292.5 | — |
| 160 | | 7.47 | 6.01 | 4.46 | 13.94 | 8.34 | 23.84 |
| | | 8.86 | 7.04 | 5.31 | 15.34 | 9.47 | 25.26 |
| | | 291.8 | 303 | 304 | 293.5 | 313.5 | 287 |
| 170 | | 4.32 | 3.31 | 2.97 | 7.35 | 4.69 | 10.06 |
| | | 5.31 | 4.09 | 3.60 | 8.50 | 5.52 | 11.25 |
| | | 303.2 | 310.8 | 313 | 317 | 315 | 311 |
| 180 | | 3.0 | 2.29 | 1.86 | 5.25 | 3.41 | 8.01 |
| | | 3.66 | 2.97 | 2.43 | 5.97 | 3.85 | 8.84 |
| | | 308.0 | 314 | 317 | 318 | 314 | 322.5 |
| 200 | | 0.86 | 0.53 | 0.40 | 1.34 | 0.74 | 2.33 |
| | | 1.46 | 1.19 | 0.94 | 1.89 | 1.22 | 2.89 |
| | | 315 | 317.3 | 318.5 | 324 | 328 | 326 |

[1] 5 cc of a 50 g. mixture charged to Hot Block

TABLE VI

Room Temperture Gel Tests Using 1% wt. Acetyl Peroxy Stearyl Carbonate (APSC)
or Benzoyl Peroxide (BPO) With Various Promoters[1]

Temperature: 23–24.5° C.
Resin: 50 g Hatco GR-941

| Peroxide | Protomer | Conc, % Wt. | Gel Time, Min. | Exotherm Time, Min. | Peak Temp, ° C |
|---|---|---|---|---|---|
| 1. APSC | (a) DMA[2] | 0.15 | 8.3 | 15.0 | 166 |
| | | 0.30 | 4.15 | 10.0 | 169.5 |
| | (b) DEA[3] | 0.30 | 22.8 | 31.5 | 166 |
| | (c) DMT[4] | 0.15 | 4.35 | 9.5 | 168 |
| | (d) MPEA[5] | 0.15 | 16.25 | 23.0 | 172.2 |
| 2. BPO | (a) DMA | 0.30 | 9.8 | 17.0 | 161.5 |
| | (b) DEA | 0.30 | 38.1 | 47.0 | 166.5 |
| | (c) MPEA | 0.30 | 13.7 | 20.5 | 166.6 |

[1] 50g of mixture used in 3oz. water cup
[2] Dimethyl aniline
[3] Diethyl aniline
[4] Dimethyl p-toluidine
[5] Methyl phenyl ethanol amine

Polymerization of MMA

Bulk polymerization of methyl methacrylate was done at 70° C. using six peroxides at equal molar concentrations. Results are shown in Table VII. t-Butyl peroxy privalate was included in this test because it is a commercial peroxide with a comparable 10 hour half-life temperature to the acyl peroxycarbonic esters. Except for LPOC, all the initiators cured the monomer in about the same length of time. However, APSC and APCC were somewhat faster than the others.

The data in Table VII was obtained in the following manner.

The approximate amount of 100 percent of pure initiator required for 30 grams of monomer mixture was weighed into a 2-ounce wide-mouth bottle to 0.1 milligram. The amount of inhibited monomer needed for the desired initiator concentration was calculated and weighed to 0.01 gram. The bottle was capped and shaken, and 25 grams of the mixture was then weighed into a 25 × 150 millimeter test tube.

A stainless steel temperature-recorded probe was centered in the test tube through three rubber stoppers with the probe protruding a distance of approximately 70 millimeters. Before each run, the end of the probe was coated with a 3 percent aqueous solution of polyvinyl alcohol as a mold-release agent. The probe was inserted while flushing the test tube with a stream of nitrogen and the sealed unit placed into a stirred constant-temperature bath (70°±0.2° C.) containing glycerine, to a depth of 110 millimeters.

TABLE VII

Polymerization of Methyl Methacrylate at 70° C With Various Acyl Peroxycarbonic Esters
1.72 × 10⁻⁴ mole initiator/100g MMA in 25 mm tube

| | Peroxide | % Wt Used | Exotherm Time, Min. | Peak Time, Min. | Time to Return to Bath Temp, Min. | Temp Rise, ° C (ΔT) |
|---|---|---|---|---|---|---|
| 1. | APSC | 0.064 | 108 | 113 | 142 | 53 |
| 2. | APCC | 0.059 | 112 | 117 | 143 | 57 |
| 3. | PPSC | 0.066 | 138 | 168 | 223 | 25 |
| 4. | PPCC | 0.062 | 132 | 158 | 200 | 28 |
| 5. | LPOC | 0.064 | very long flat exotherm | | ~360[1] | ≦ 5 |
| 6. | t-Butyl peroxy pivalate | 0.03 | 135 | 143 | 180 | 51 |

[1]Cured hard much slower than other runs shown.

Initiators for the Suspension Polymerization of Vinyl Chloride and Vinyl Chloride/Vinyl Acetate.

Suspension polymerization was done at 60° C. in pop bottles for both homopolymer and copolymer. Again, t-butyl peroxypivalate was included in the testing because it is used commercially for this purpose. As can be seen from the date in Table VIII, the acyl peroxycarbonic esters are not as efficient as t-butyl peroxypivalate on an equal weight basis, but are superior to it on an equal molar basis.

The data in Table VIII was obtained in the following manner.

The suspension polymerizations was performed in 12 fluid ounce pop bottles using uninhibited monomer. Each bottle contained 188.0 g. of suspension solution and 75 g. of monomer (water/monomer ratio = 2.5/1). The amount of suspension agent per 100 g. monomer = 0.35 g. Methocel 90HG, 100 cps. For the copolymer runs, 75 g. of a mixture of 88%wt vinyl chloride and 12%wt vinyl acetate were used.

After the desired amounts of pure initiator were added to the pop bottles, they were capped, the contents almost melted, and the bottles placed in a rotating constant temperature bath at 60° C. for varying lengths of time. Duplicate bottles were pulled at each time interval. The bottles were frozen before venting-off excess monomer. The polymer was filtered, washed, and dried.

TABLE VIII

Suspension Polymerization of Vinyl Chloride and Vinyl Chloride-Vinyl Acetate in Pop Bottles at 60° C

| | Peroxide | % Wt. Used | Time, Hrs | % Conversion 1.5 | 3.5 | 5 |
|---|---|---|---|---|---|---|
| (A) Homopolymer | | | | | | |
| 1. | APSC | 0.055 | | 9.9 | 32.5 | 53.3 |
| | | 0.118[1] | | 21.1 | 60.5 | 91.8 |
| 2. | APCC | 0.055 | | 10.4 | 34.7 | 58.1[2] |
| | | 0.109[1] | | 20.5 | 65.4 | 93.2 |
| 3. | t-Butyl peroxy pivalate (TBPP) | 0.055[1] | | 15.0 | 53.4 | 84.4 |
| (B) Copolymer | | | | | | |
| 4. | APSC | 0.055 | | 12.1 | 32.2[2] | 52.6 |
| 5. | PPSC | 0.118[1] | | 22.0[2] | 64.0 | 89.7 |
| | | 0.055 | | 12.2 | — | 52.9 |
| | | 0.122[1] | | 23.3 | 60.8 | 86.0 |
| 6. | TBPP | 0.055[1] | | 18.9 | 57.3 | 79.1 |

[1]3.16×10⁻⁴ mole/100 g VCM or VC-VA
[2]poor duplication

Vulcanization of Silicone Rubber

Vulcanization of a general purpose silicone rubber was done in the Brabender Plasticorder at 110° C. using four initiators at equal molar concentrations. Results are shown in Table IX. 2,4-Dichloro benzoyl peroxide (2,4 DiCl BZP) was used in this work because it is the preferred commercial peroxide used for vulcanization of silicone rubber. Although the acyl peroxycarbonic esters are not as efficient as 2,4 DiCl BZP, they do vulcanize this type of silicone rubber. APSC and APCC gave almost identical results, whereas PPSC was only about 25 percent as efficient as they were.

The data in Table IX was obtained in the following manner. 53. g. of milled rubber (Dow Corning Silastic 4506U) were added within 1 minute to the mixing head maintained at the desired temperature. The rubber was added in small pieces. Net torque is equal to the maximum torque minus the minimum torque just before crosslinking begins. The time to reach maximum torque is equal to the elapsed time from zero.

TABLE IX

Vulcanization of Silicone Rubber in the Brabender Plasticorder with Various Acyl Peroxycarbonic Esters at 110° C
1.645 × 10⁻³ mole initiator/100g Silicone Rubber; 30 RPM Rotor Speed

| | Peroxide | phr 50% Paste | Net Torque, Mg. | Time to Reach Maximum Torque, Min. |
|---|---|---|---|---|
| 1. | APSC | 1.23 | 798 | 4.3 |
| 2. | APCC | 1.13 | 790 | 4.3 |
| 3. | PPSC | 1.27 | 208 | 5.4 |
| 4. | 2,4-Dichloro-benzoyl Peroxide | 1.25 | 950 | 2.4 |

We claim:

1. Acyl peroxycarbonic esters of the formula:

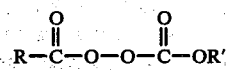

$$R-\overset{O}{\underset{\|}{C}}-O-O-\overset{O}{\underset{\|}{C}}-OR'$$

where R is selected from methyl and ethyl; and R' is an alkyl group which together with R contains a total of 17 to about 25 carbon atoms.

2. An acyl peroxycarbonic ester in accordance with claim 1, wherein R and R' contain a total of 17 to about 20 carbon atoms.

3. An acyl peroxycarbonic ester in accordance with claim 1, wherein R is methyl.

4. An acyl peroxycarbonic ester in accordance with claim 1, wherein R is ethyl.

5. An acyl peroxycarbonic ester in accordance with claim 3, wherein R' is a cetyl group.

6. An acyl peroxycarbonic ester in accordance with claim 3, wherein R' is a stearyl group.

7. An acyl peroxycarbonic ester in accordance with claim 4, wherein R' is a cetyl group.

8. An acyl peroxycarbonic ester in accordance with claim 4, wherein R' is a stearyl group.

* * * * *